(12) United States Patent
Wang et al.

(10) Patent No.: US 8,065,311 B2
(45) Date of Patent: Nov. 22, 2011

(54) RELEVANCE SCORE IN A PAID SEARCH ADVERTISEMENT SYSTEM

(75) Inventors: Mingyu Wang, Beijing (CN); Weibin Zhu, Beijing (CN); Ying Li, Bellevue, WA (US); Qiaolin Mao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 12/147,417

(22) Filed: Jun. 26, 2008

(65) Prior Publication Data

US 2009/0327265 A1    Dec. 31, 2009

(51) Int. Cl.
*G06F 7/00* (2006.01)
*G06F 17/30* (2006.01)
(52) U.S. Cl. .................................. 707/748; 707/752
(58) Field of Classification Search .................. None
See application file for complete search history.

(56) References Cited

U.S. PATENT DOCUMENTS

| | | | |
|---|---|---|---|
| 7,043,450 | B2 | 5/2006 | Velez et al. |
| 7,647,314 | B2 * | 1/2010 | Sun et al. ...................... 707/742 |
| 2004/0186769 | A1 | 9/2004 | Mangold et al. |
| 2005/0091106 | A1 | 4/2005 | Reller et al. |
| 2005/0144065 | A1 | 6/2005 | Calabria et al. |
| 2005/0234880 | A1 * | 10/2005 | Zeng et al. .......................... 707/3 |
| 2006/0080172 | A1 | 4/2006 | Najarian et al. |
| 2007/0192293 | A1 * | 8/2007 | Swen ............................... 707/3 |
| 2007/0214158 | A1 | 9/2007 | Kamen |
| 2007/0233566 | A1 | 10/2007 | Zlotin et al. |
| 2007/0233653 | A1 | 10/2007 | Biggs et al. |
| 2007/0250855 | A1 | 10/2007 | Quinn-Jacobs et al. |
| 2008/0126303 | A1 * | 5/2008 | Park et al. ......................... 707/3 |

OTHER PUBLICATIONS

Elesseily, "New Panama Ranking System for Yahoo Ads Launches Today", Feb. 5, 2007, pp. 4.
"Google Quality Scores for Natural Search Optimization", 2005-2007, naturalsearchblog.com, pp. 8.
Feng et al., "Implementing Sponsored Search in Web Search Engines: Computational Evaluation of Alternative Mechanisms", INFORMS Journal on Computing, vol. 19, No. 1, Jan. 2007, pp. 1-25.

* cited by examiner

*Primary Examiner* — Uyen T. Le

(57) ABSTRACT

Described is a paid search advertising technology in which advertisements associated with bidding keywords are ranked by relevance when returning one or more advertisements in a response to a query. A relevance score is computed for an advertisement based on the bidding keyword and page data (text and/or other page content) of the advertisement. The relevance score may be based on a similarity vector score computed from a keyword vector and page data vector relationship, combined with a proximity score computed from the keyword's bigram set and the page data bigram set. When a query is received, advertisements are selected based on the proximity of the query to each advertisement's bidding keyword, providing candidate scores. Each candidate score is modified (e.g., multiplied) into a final score based on its respective advertisement's relevance score. The final scores are then used to re-rank the advertisements relative to one another.

16 Claims, 5 Drawing Sheets

RELEVANCE SCORE IN A PAID SEARCH ADVERTISEMENT SYSTEM

BACKGROUND

Internet users often receive advertisements in response to their queries, whether directly or alongside other query results that show up as links from which the user may further click to view the content select content. In a paid search advertisement system, advertisers bid on certain search terminology (a "keyword" as used herein, whether it is one or more search terms), so that their advertisement is selected and returned when the user's search keyword is similar to the bidding keyword. A vector-based scoring system is typically used in determining similarity.

However, many times a selected advertisement page is not particularly relevant to the user's query. This is because many advertisers have bid on the same keyword for their corresponding advertisement page. This is bad for both users and advertisers, as users see advertisements that are irrelevant, while advertisers pay for showing advertisements that will not result in business.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a content page such as an advertisement is returned based on relevance. To this end, each content page is associated with a relevance score that is later used in query handling to select (which may be a ranking operation) one or more of those content pages relative to others.

For example, given an advertisement for a content page and a bidding keyword, an offline processing mechanism determines a keyword vector representing the bidding keyword, and a page data vector representing the page data for the advertisement. Page data may include text and other content. The mechanism then computes a similarity score for the advertisement based on a vector relationship between the bidding keyword vector and the page data vector. Further, the mechanism computes a proximity score for the advertisement, such as based on bigrams that are in common between the keyword and the page data. The mechanism combines the similarity score and the proximity score into the relevance score that is then associated with that bidding keyword.

In online usage upon receiving a query, the relevance score is used to select the advertisement from among a plurality of advertisements. In one aspect, the relevance score is used to obtain a final score for a candidate advertisement by modifying a candidate score for the query versus the keyword for that advertisement, such as a candidate score based on a proximity relationship between the query and the bidding keyword. The final candidate scores may then be ranked, e.g., for selecting one or more advertisements based on relevance.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards considering the relevance of an advertisement page when selecting an advertisement based on a user query and a bidding keyword. To this end, a relevance score is computed and used to measure the relevance between a bidding keyword and advertisement page, then use that relevance score in selecting advertisements for a given user query.

While some of the examples described herein are directed towards an advertising model, other uses for a relevance score with respect to matching content to a query are feasible. Further, while actual page content is considered in determining relevance as described below, it is understood that the page content may or may not be directly returned in response to a user query, but rather only a link to that page, possibly among other links and/or content. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and searching in general.

Figure 1:
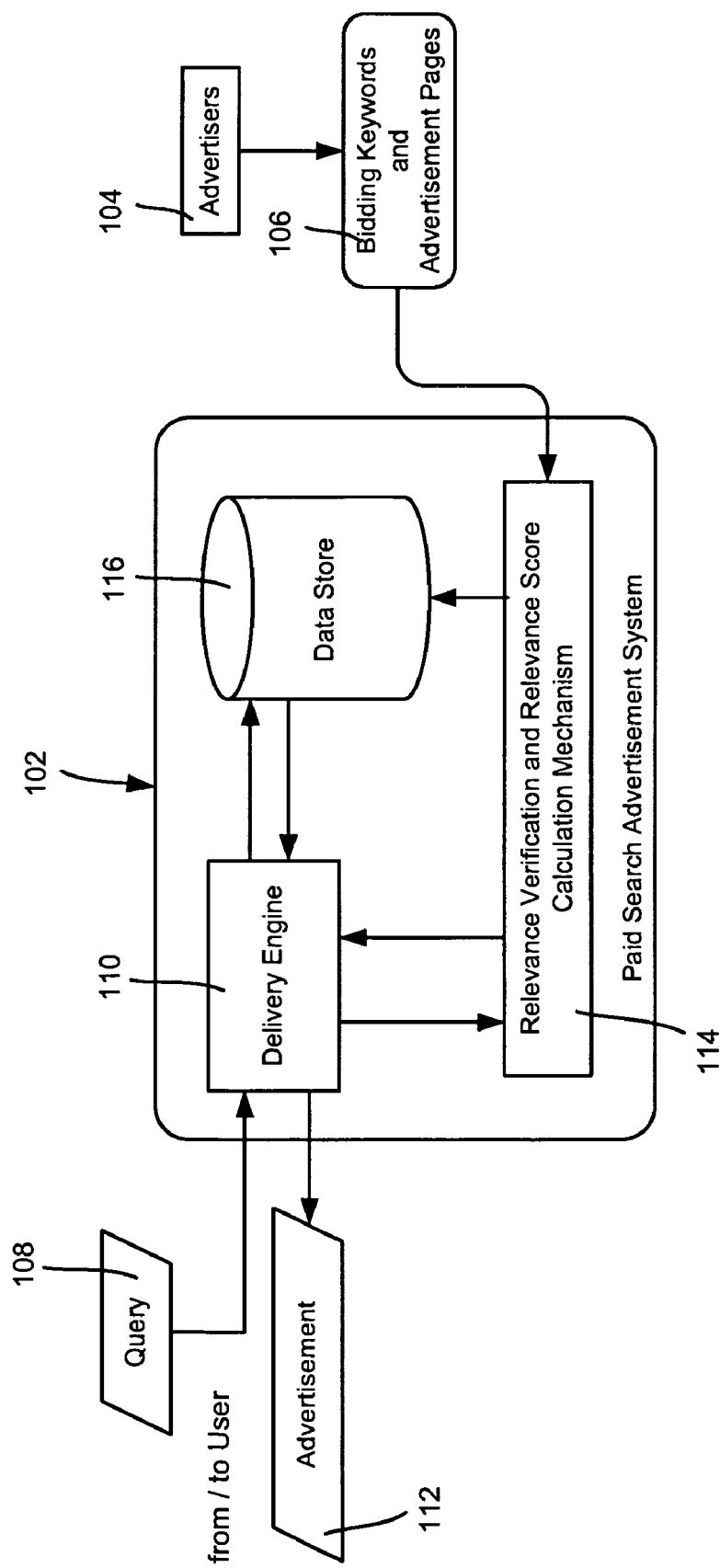
FIG. 1 is a block diagram representing example components in paid search advertisement system.

Turning to FIG. 1, there is shown a general block diagram representing example components in a paid search advertisement system 102. In general, advertisers 104 provide advertisements in the form of content pages to the system 102, along with a bidding keyword comprising one or more terms (typically words; usually advertisers bid a long list of keywords for one advertisement page) that the advertiser wants to match to a query; this is represented in FIG. 1 by the block 106). Thus, for example, one advertiser may agree to pay money to have its advertisement page returned (e.g., directly or as a link thereto) when queries are submitted that match or are similar to the bidding keyword "high resolution digital camera" and so forth.

FIG. 1 shows such a query 108 being received at a delivery engine 110, resulting in an advertisement 112 returned in response to the query, possibly as a link along with other content, links and/or advertisements. As can be readily appreciated, multiple advertisement links may be ranked in some way based on a scoring system, including a relevance scoring system as described herein.

For efficiency, the paid search advertisement system 102 typically does not dynamically compute such scores for advertisements, but rather pre-computes them offline, for later comparing to queries for selection purposes as a query arrives. A relevance verification and relevance score calculation mechanism 114 as represented in FIG. 1 may be used for this purpose, basically taking each accepted advertisement and its bidding keyword, computing a relevance score for that advertisement, and storing the advertisement (or pointer thereto), the bidding keyword (e.g., represented as a vector), and relevance score in association with one another in a data store 116. Note that the delivery engine also works with the relevance verification and relevance score calculation mechanism 114 when selecting an advertisement for a query, however it is understood that such a mechanism 114 may be separated into multiple components, e.g., an offline computation mechanism and a dynamic selection mechanism.

Figure 2:
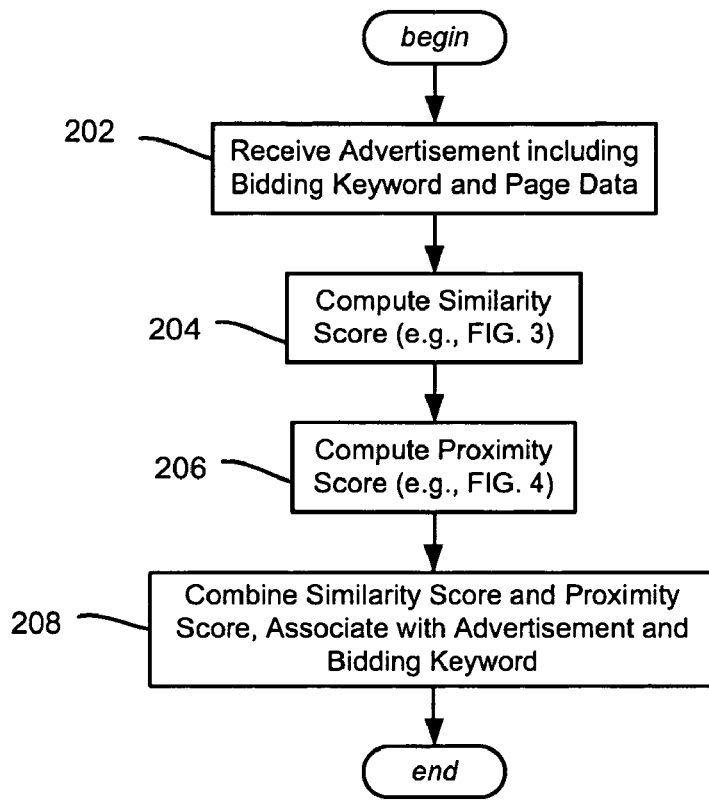
FIG. 2 is a flow diagram showing example steps taken to compute a relevance score for associating with an advertisement page.
Figure 3:
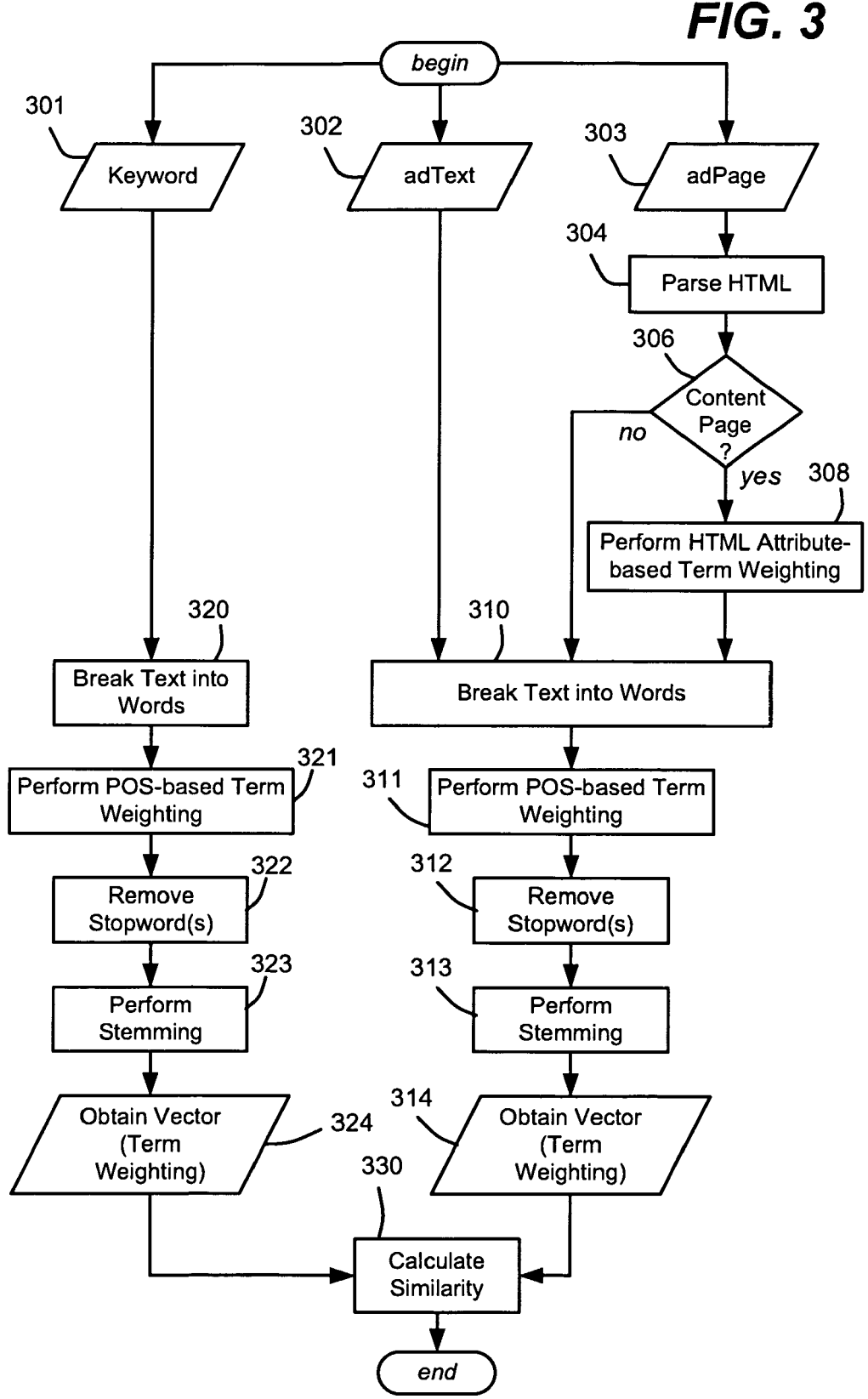
FIG. 3 is a flow diagram showing example steps taken to compute a similarity score for an advertisement page that factors into a relevance score.
Figure 4:
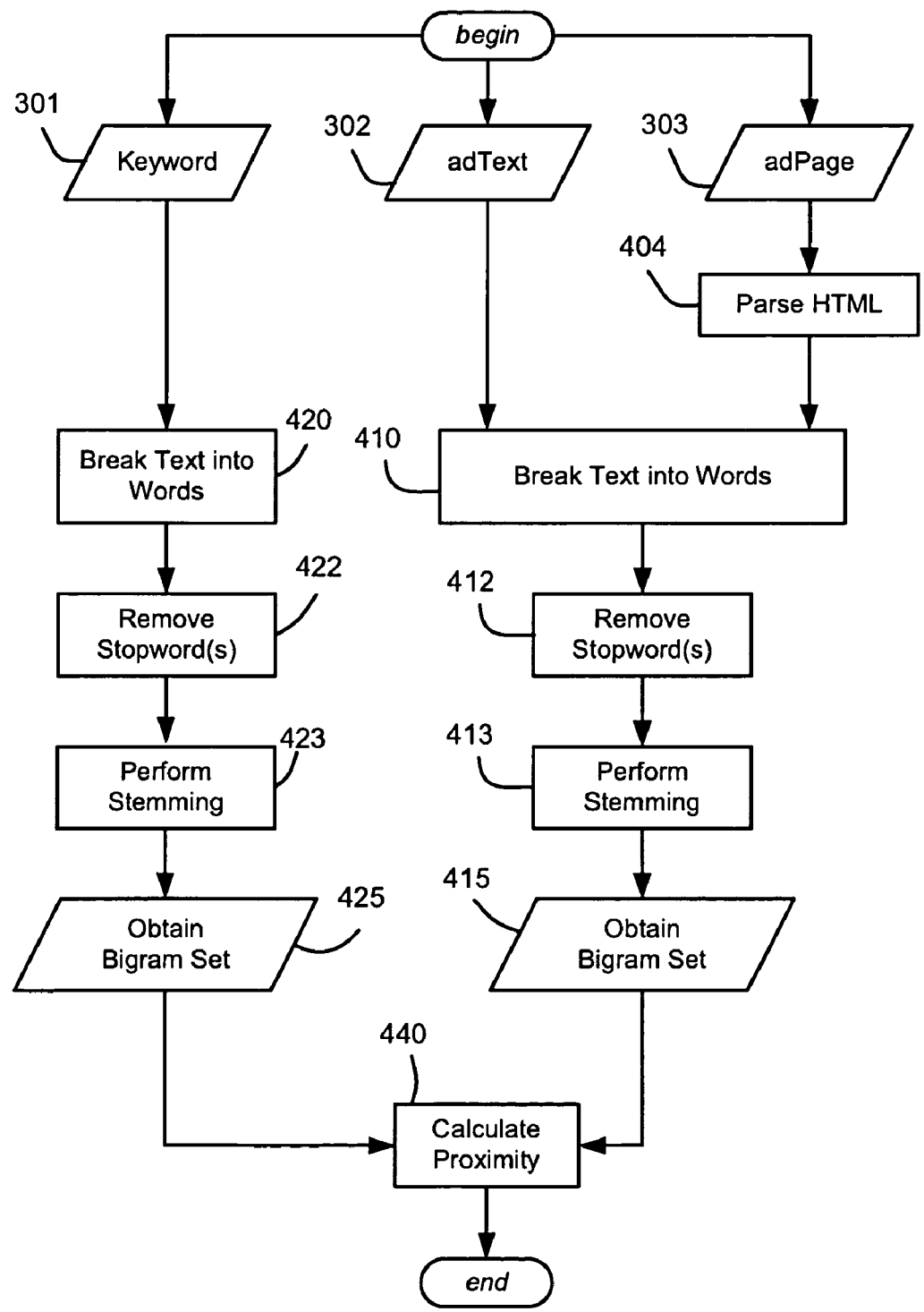
FIG. 4 is a flow diagram showing example steps taken to compute a proximity score for an advertisement page that factors into a relevance score.

FIGS. 2-4 represent the offline operation used to calculate the relevance score in one example implementation. In general, step 202 represents receiving an advertisement comprising page data (e.g., HTML, including text and other page data) and its associating bidding keyword. Step 204 computes a similarity score for the advertisement as described below with reference to FIG. 3; step 206 computes a proximity score for the advertisement as described below with reference to FIG. 4. Step 208 represents combining the similarity score with the proximity score into a relevance score that is then associated with the advertisement and bidding keyword in the data store 116. The operations of FIG. 2 are repeated for each advertisement that is accepted for use. Note that one advertisement may be associated with multiple keywords.

In one implementation, the relevance score computation is:

Relevance Score=$A$*(Similarity Score)+$B$*(Proximity Score)

where A and B are weight factors that sum to one, that is, A+B=1.0. Note however that any mathematical combination and/or weighing system may be used. Further, note that A and B may be determined by training with actual data; relevance score factors may be trained like other such factors by applying known training techniques.

FIG. 3 provides an example of computing the similarity score for a given keyword 301 and its corresponding advertisement (adText portion 302 and adPage portion 303) page data in one implementation. In general, the similarity score indicates how many words in strings are in common/shared between them.

As represented in FIG. 3, the adPage portion (its HTML) is parsed at step 304 to determine whether or not it is a content page. To determine whether the page data comprises a content page, note that adPages are divided into one of two types, namely a link-intensive page or a content page. This is determined by link density, e.g., the ratio of text corresponding to links to the total text (e.g., a length ratio). If this ratio value is above certain threshold, as evaluated at step 306 the page is considered a link-intensive page, otherwise it is a content page.

If the analysis indicates that the adPage portion corresponds to a content page type, HTML attribute-based term weighting is performed at step 308 so as to weigh certain terms relative to one another. To this end, link blocks are detected (e.g., when an HTML block has sufficiently high link density, it is regarded as link block). For any text within a link block, a lower weight such as 0.8 is assigned; for other text (not within a link block), a weight such as 1.0 is assigned.

Step 310 represents breaking the text into words. Note that the adText portion 302 is merged in some appropriate way with the adPage portion's text, such as by string concatenation. Step 311 performs POS-based term weighing on the text, where POS stands for "Part Of Speech"-based identification/tagging. For example, in one implementation, a noun may be assigned a weight of 1.0, a verb assigned a weight of 0.8, and other types of words assigned a weight of 0.4.

Step 312 is performed to remove any stopwords, such as irrelevant words like "the", "a", "and" and so forth from the string. Step 313 performs stemming, which is generally mapping various forms of words to one root word, e.g., "finding", "finder" and "finds" and so forth each become "find" after stemming.

Step 314 arranges the string into a vector, based on term weighting. That is, the terms (as weighed by HTML attribute and/or POS weight assigning) are combined in a known manner (also based on term frequency) into a vector.

Steps 320-324 mirror those of steps 310-314 for processing the keyword 301. For purposes of brevity, these steps are not described again, except to note that another vector is determined for the keyword. Also, note that the keyword bigram set may be cached in association with this advertisement; in one implementation this avoids re-computation, as it is used again.

Step 330 calculating a similarity score based on the vectors that were computed. In one implementation, the similarity score is the cosine value resulting from the angular relationship between the two vectors (as is typical in a vector space model). Note that the advertisement's text and page content factors into the final vector.

FIG. 4 represents determining the proximity score based on the keyword 301, the adText portion 302 and adPage portion 303. In general, a proximity score is based on the word order of one or more strings. Step 404 parses the HTML of the adPage portion to obtain its text, which is then broken into words along with the text of the adText portion 302.

Steps 410, 412 and 413 and 420, 422 and 413 are generally like those of steps 310, 312 and 313 detailed above (note that there is no POS or other weighting, generally because a vector is not being generated for the proximity calculation). For purposes of brevity, these steps are not described again.

With the resultant strings, step 415 obtains a bigram set based on the adText/adPage string, while step 425 obtains a bigram set based on the keyword string. Note that a bigram is pair of consecutive words, e.g., for the keyword "high resolution digital camera", the bigram set is "high resolution", "resolution digital" and "digital camera". Note that trigrams and so forth may also be considered, but are not described in this example.

At step 440, the proximity score is determined from the common bigrams between the keyword bigram set and the adPage/adText bigram set divided by the total number of bigrams. As can be readily appreciated, other ways to determine a score from such bigram (and/or other word-ordering-based) sets may be used. With the similarity score (FIG. 3) and the proximity score (FIG. 4), the relevance score may be computed and associated with the advertisement as described above (step 208 of FIG. 2).

Figure 5:
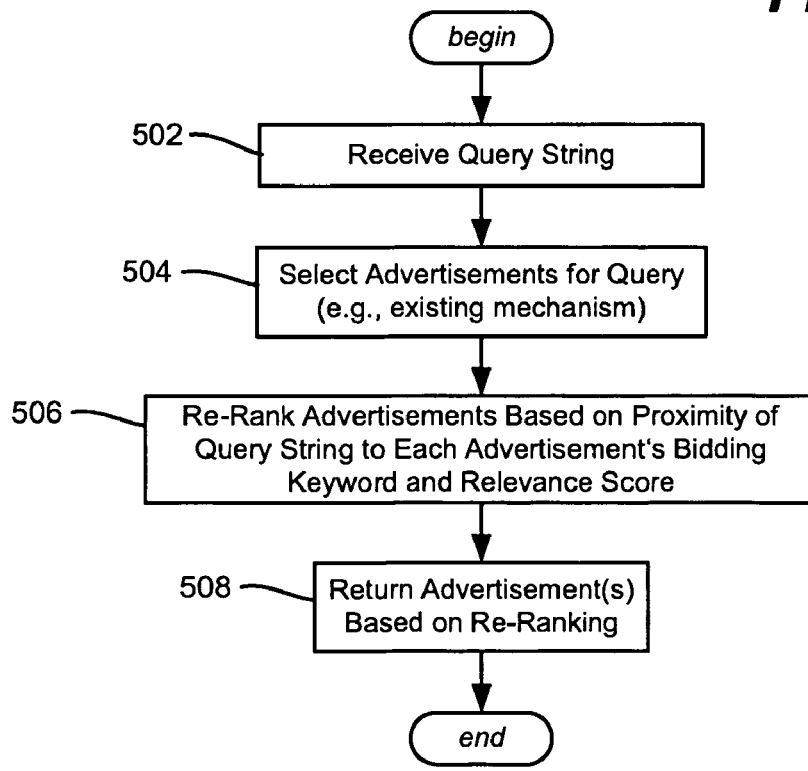
FIG. 5 is a flow diagram showing example steps taken to locate a relevant advertisement in response to a query.

FIG. 5 shows the online use of the relevance score by the delivery engine in selecting an advertisement (or ranking multiple advertisements) based on relevance. Step 502 represents receiving the query string. At step 504, candidate advertisements are selected in a known manner, that is based on the query string's proximity bigram set and the bidding keyword's proximity bigram set (re-computed or retrieved from a cache as it was computed at step 425 of FIG. 4). In one implementation, the determination of the bigram set for the query uses the same steps as used for the keyword, e.g., steps 420-423 apply, but using the query string as input. Further, the keyword-versus-query bigram set score computation may be the same, that is, common bigrams over total bigrams.

In any event, the advertisements are re-ranked based on their relevance score that was previously computed. In one example, this is a straightforward multiplication, e.g., the final score for each advertisement used in ranking them relative to one another is:

(Proximity of the query string and bidding keyword)
*Relevance Score

Step 506 represents this computation and the re-ranking. Step 508 returns the top advertisement or top-n number of ranked advertisements, e.g., as a set of ranked links.

Exemplary Operating Environment

Figure 6:
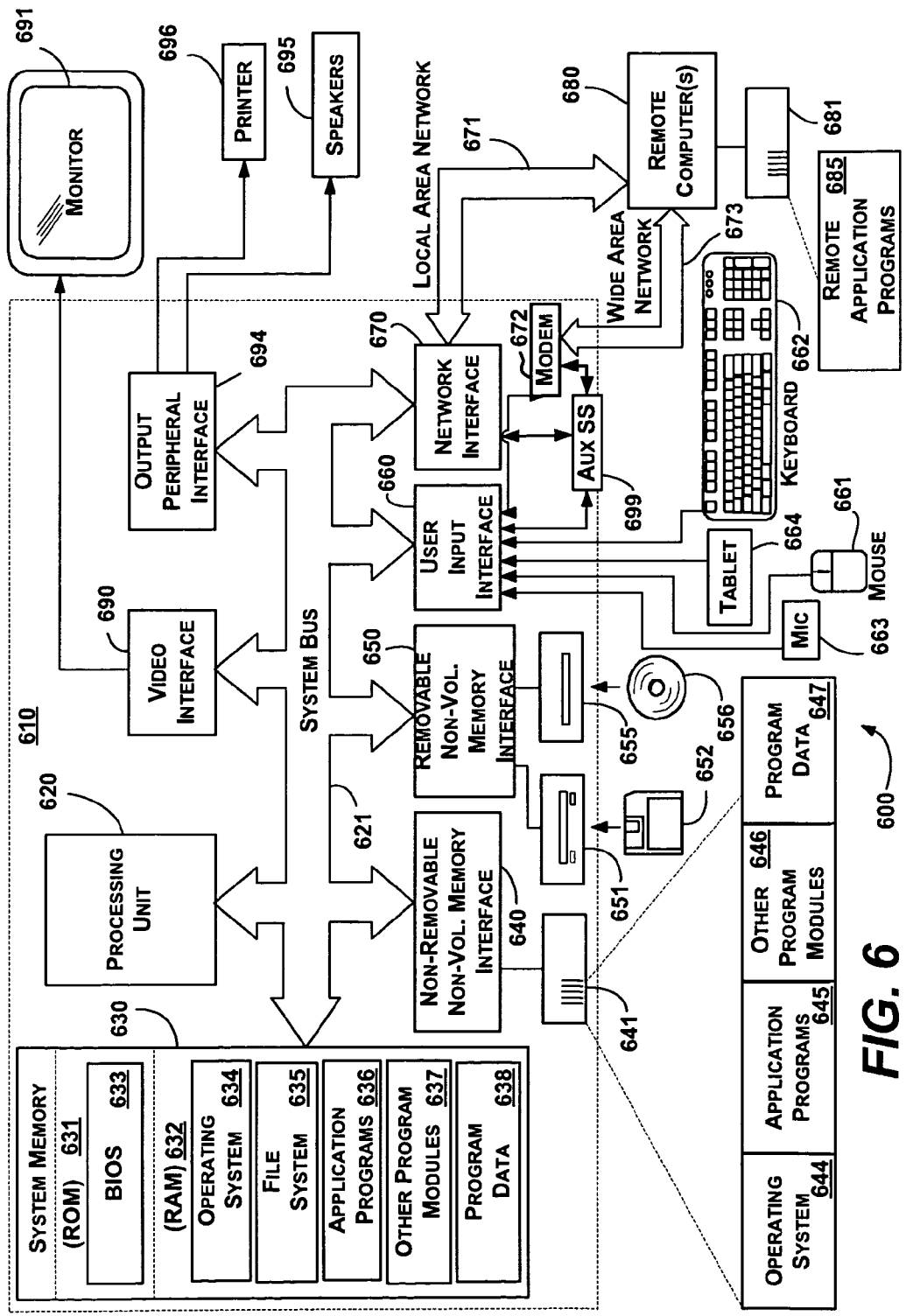
FIG. 6 shows an illustrative example of a computing environment into which various aspects of the present invention may be incorporated.

FIG. 6 illustrates an example of a suitable computing and networking environment 600 into which the examples and implementations of any of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   using a computer, determining a similarity score for a page based on similarity between a keyword for the page and page data of the page, wherein determining the similarity score comprises obtaining a first vector from the keyword, obtaining a second vector from the page data, and determining the similarity score based on a relationship between the first and second vectors, wherein the page data includes a page portion and a text portion corresponding to a first set of text, and further comprising, parsing at least part of the page portion into a second set of text, and wherein obtaining the second vector comprises processing the first and second sets of text based on term weighting;
   determining a proximity score for the page based on proximity between the keyword for the page and the page data based on word order;
   combining the similarity score and the proximity score into a relevance score; and
   associating the relevance score with the keyword and the page.

2. The method of claim 1 wherein the page comprises an advertisement and wherein the keyword comprises a bidding keyword.

3. The method of claim 1 further comprising, receiving a query and using the relevance score to select the page from among a plurality of pages.

4. The method of claim 1 further comprising, determining whether the page portion corresponds to a content page, and if so, weighing the second set of text differently from when the second set of text does not correspond to a content page.

5. The method of claim 4 wherein determining whether the second set of text corresponds to a content page comprises computing a link density based on the page portion.

6. The method of claim 1 wherein obtaining the first vector from the keyword includes weighing at least one term of the keyword based on part of speech term weighing.

7. The method of claim 1 wherein obtaining the first vector from the keyword includes performing stopword removal on the keyword or performing stemming on the keyword, or performing both stopword removal and stemming on the keyword.

8. The method of claim 1 wherein determining the proximity score comprises obtaining a first word set from the keyword, obtaining a second word set from the page data, and using commonality between the first and second word sets to determine the proximity score.

9. The method of claim 1 wherein determining the proximity score comprises obtaining a first bigram set from the keyword, obtaining a second bigram set from the page data, and obtaining a value based on bigrams common to both bigram sets relative to a total number of bigrams in both bigram sets.

10. The method of claim 9 wherein obtaining the first bigram set from the keyword includes performing stopword removal on the keyword or performing stemming on the keyword, or performing both stopword removal and stemming on the keyword.

11. The method of claim 1 further comprising:
    associating relevance scores for a plurality of pages;

receiving a query;
using the relevance scores to rank the plurality of pages; and
re-ranking the plurality of pages based on a proximity relationship between the query and the keyword, and, the relevance score of each of the plurality of pages.

12. In a computing environment, a system comprising:
a computer comprising a relevance score calculation mechanism that determines a similarity score for an advertisement based on similarity between a bidding keyword for the advertisement and advertisement data of the advertisement, wherein the similarity score is determined by obtaining a first vector from the bidding keyword, obtaining a second vector from the advertisement data, and determining the similarity score based on a relationship between the first and second vectors, wherein the advertisement data includes an advertisement portion and a text portion corresponding to a first set of text, and further comprising, parsing at least part of the advertisement portion into a second set of text, and wherein obtaining the second vector comprises processing the first and second sets of text based on term weighting, the relevance score calculation mechanism further determines a proximity score for the advertisement based on proximity between the bidding keyword for the advertisement and the advertisement data based on word order, the relevance score calculation mechanism further combining the similarity score and the proximity score into a relevance score and associating the relevance score with the bidding keyword and the advertisement;
a data store coupled to the relevance score calculation mechanism that stores the relevance score in association with the bidding keyword of that advertisement, and maintains other relevance scores for other bidding keywords of other advertisements; and
a delivery engine coupled to the data store to return at least one advertisement selected from the data store based on a query keyword obtained from the query and the stored relevance information associated with the bidding keyword of that advertisement.

13. The system of claim 12 further comprising a relevance verification mechanism coupled to the delivery engine that selects a set of advertisements based on relationships between the query keyword and the bidding keyword of each advertisement, computes a final score for each advertisement of the set based on the relationships between the query keyword and the bidding keyword and the relevance score associated with that advertisement, and ranks the advertisements relative to one another based on each advertisement's final score.

14. One or more computer storage media having computer-executable instructions, which when executed perform steps, comprising:
determining a bidding keyword vector representing the bidding keyword for an advertisement and a page data vector representing the page data for the advertisement;
computing a similarity score for the advertisement based on a vector relationship between the bidding keyword vector and the page data vector;
computing a proximity score for the advertisement based at least in part on bigrams in common between the keyword and the page data;
combining the similarity score and the proximity score into a relevance score;
associating the relevance score with the advertisement;
associating relevance scores for a plurality of advertisements;
receiving a query;
using the relevance scores to rank the plurality of advertisements; and
re-ranking the plurality of advertisements based at least in part on a relationship between the query and the bidding keyword and the relevance score of each of the plurality of advertisements.

15. The one or more computer storage media of claim 14 having further computer-executable instructions comprising, determining a proximity relationship between bigrams of the query in common with bigrams of the bidding keyword.

16. The one or more computer storage media of claim 14 wherein determining the page data vector comprises weighing a term in the page data relative to other terms based on page content analysis, HTML attribute analysis, or part of speech analysis, or any combination of page content analysis, HTML attribute analysis, or part of speech analysis.

* * * * *